(12) United States Patent
Kudrus et al.

(10) Patent No.: US 9,315,336 B2
(45) Date of Patent: Apr. 19, 2016

(54) APPARATUS AND METHOD FOR TRANSPORTING GOODS

(71) Applicant: BOEWE SYSTEC GmbH, Augsburg (DE)

(72) Inventors: Heiner Kudrus, Augsburg (DE); Bernd Hoepner, Augsburg (DE); Joachim Koschier, Augsburg (DE); Reinhard Seiler, Aindling (DE); Ronald Celeste, Kuehlenthal (DE)

(73) Assignee: BOEWE SYSTEC GmbH, Augsburg (DE)

( * ) Notice: Subject to any disclaimer, the term of this patent is extended or adjusted under 35 U.S.C. 154(b) by 133 days.

(21) Appl. No.: 14/014,621

(22) Filed: Aug. 30, 2013

(65) Prior Publication Data
US 2014/0069774 A1 Mar. 13, 2014

(30) Foreign Application Priority Data

Sep. 7, 2012 (DE) .......................... 10 2012 215 923

(51) Int. Cl.
| | |
|---|---|
| *B65G 15/20* | (2006.01) |
| *B65G 47/24* | (2006.01) |
| *B65H 29/00* | (2006.01) |
| *G07B 17/00* | (2006.01) |
| *B41J 25/308* | (2006.01) |
| *B41J 11/00* | (2006.01) |
| *B41J 11/20* | (2006.01) |

(52) U.S. Cl.
CPC ............... *B65G 47/24* (2013.01); *B41J 11/007* (2013.01); *B41J 11/0035* (2013.01); *B41J 11/20* (2013.01); *B41J 25/3088* (2013.01); *B65H 29/00* (2013.01); *G07B 17/00508* (2013.01); *B65H 2404/53* (2013.01); *B65H 2511/13* (2013.01); *B65H 2511/16* (2013.01); *B65H 2511/17* (2013.01); *B65H 2701/1125* (2013.01); *B65H 2701/1916* (2013.01); *G07B 2017/00556* (2013.01)

(58) Field of Classification Search
CPC ........ B65G 15/34; B65G 15/32; B23Q 1/035; B23Q 1/032; B23Q 1/037
USPC ...................... 198/846, 867.11, 803.14, 626.2
See application file for complete search history.

(56) References Cited

U.S. PATENT DOCUMENTS

| | | | | |
|---|---|---|---|---|
| 3,050,173 | A | * | 8/1962 | Wimmer .................... 198/468.1 |
| 3,446,332 | A | * | 5/1969 | Bechtloff ................... 198/626.2 |
| 3,880,274 | A | * | 4/1975 | Bechtloff et al. .......... 198/626.2 |
| 4,420,923 | A | * | 12/1983 | Moser ............................... 53/51 |

(Continued)

FOREIGN PATENT DOCUMENTS

WO 04/000500 A1 12/2003

*Primary Examiner* — James R Bidwell
(74) *Attorney, Agent, or Firm* — Keating & Bennett, LLP

(57) ABSTRACT

An apparatus for transporting goods includes a deformable transport unit, a unit for supplying a goods item to the deformable transport unit and a unit for impressing the goods item into the deformable transport unit so that a top of the goods item facing away from the transport unit has a predetermined height position d with respect to the unit for impressing. The deformable transport unit is implemented such that the predetermined height position of the goods item outside the effective area of the unit for impressing the goods item is at least temporarily maintained. The unit for impressing the goods item include an element arranged at a distance to the deformable transport unit and a goods item for impressing into the deformable transport unit is moved past the element.

19 Claims, 7 Drawing Sheets

(56) References Cited

U.S. PATENT DOCUMENTS

| | | |
|---|---|---|
| 4,936,560 A | 6/1990 | Barozzi |
| 6,695,298 B1 | 2/2004 | Hertz et al. |
| 7,028,391 B2 * | 4/2006 | Pham-Van-Diep et al. .. 269/266 |
| 8,282,066 B2 * | 10/2012 | Bourrieres et al. ........... 269/266 |

* cited by examiner

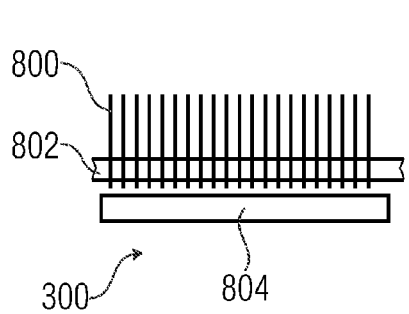
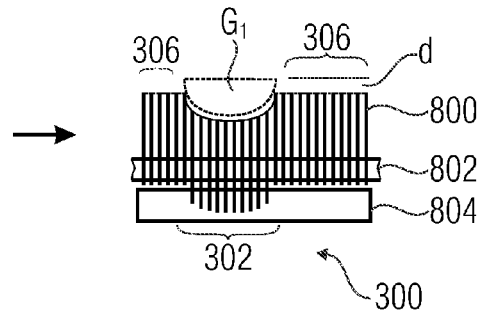
FIGURE 8A        FIGURE 8B
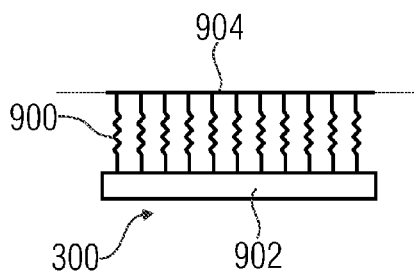
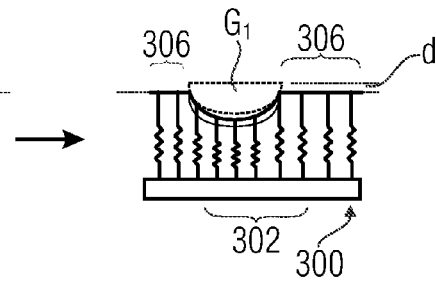
FIGURE 9A        FIGURE 9B
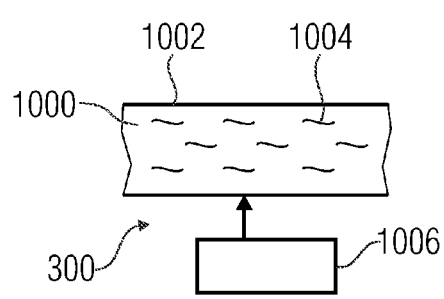
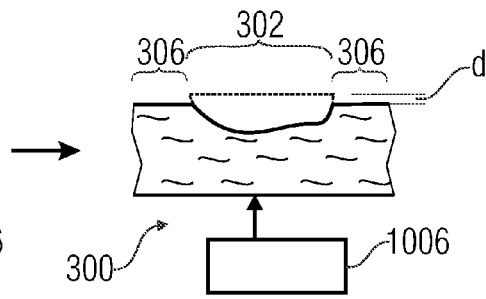
FIGURE 10A       FIGURE 10B
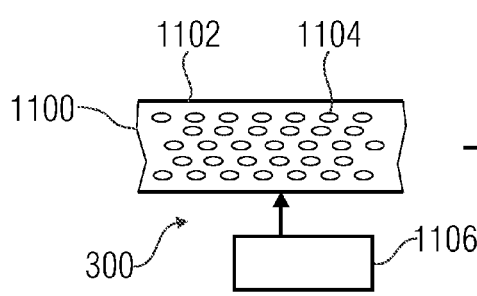
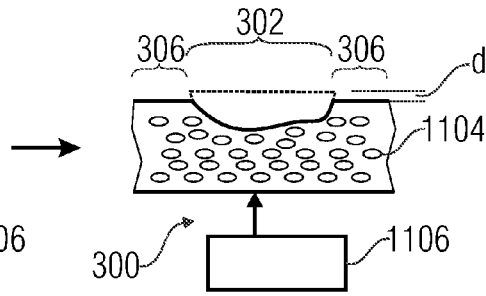
FIGURE 11A       FIGURE 11B

ABSTRACT# APPARATUS AND METHOD FOR TRANSPORTING GOODS

CROSS-REFERENCE TO RELATED APPLICATIONS

This application claims priority from German Patent Application No. 102012215923.1, which was filed on Sep. 7, 2012, and is incorporated herein in its entirety by reference.

BACKGROUND OF THE INVENTION

The present invention relates to an apparatus and a method for transporting goods, in particular to an apparatus and a method as used in the field of paper handling for supplying goods to processing, wherein the goods can be flat goods, for example filled envelopes, packaging, groups of products, sheets or groups of sheets.

Apparatuses for transporting and processing envelopes are known in conventional technology. Such apparatuses comprise, for example, a printer for printing a surface of a filled envelope, for example an address, other information, advertising or also for franking the envelope. In such known apparatuses that are to effect processing of the transported goods, it is necessitated that the goods are moved at a predetermined distance with respect to the processing station; in the case of a printer, it is necessitated to maintain a predetermined distance between the surface of the envelope and the print heads of the printer to ensure proper printing. In other examples, the envelope is supplied to the processing station, and it is desirable that the envelope is, with its top surface, in a specific relation with respect to the inlet of the processing station. The processing station can, for example, be a franking unit, a labeler, a laminator or a coater.

As long as the goods to be processed have the same thickness, maintaining the distance between processing station and the surface of the goods item presents no problem, since all elements of the apparatus can be adjusted accordingly. However, in the field of paper handling, envelopes having differing thickness result when generating items of mail, depending on how heavily and with what the envelopes are filled. This has the effect that envelopes provided by an enveloper have varying thicknesses, so that no constant distance is given between the processing station and the surface of the envelope.

In the case of printers, it can, for example, be intended in this situation to contact the filled envelopes in edge areas of the same by a top guide, wherein the top guide is adjusted such that a distance of the envelope to the processing station corresponds to a desired distance and hence proper printing can be ensured in most cases. However, it is a disadvantage of this implementation that, due to the top guides engaging, for example, laterally with the transported envelope, not the complete surface of the envelope is available for printing and an edge area remains free. Further, the envelopes can contain goods causing irregular thickness distribution across the width and the length of the envelope, so that, particularly in the case of lateral top guides acting only on the edge areas of the envelope, varying thicknesses exist in the area between the guides, which has the effect that, at least partly, the distance to the processing station is less than the desired or necessitated distance, so that problems in printing can arise despite the guide. Although this can be suppressed by dimensioning the guides accordingly or by providing further guiding elements, the printable area on the surface of the envelope or goods item is limited even further thereby.

A further approach known in conventional technology is to detect the thickness of the goods item prior to its transport and further processing and, depending thereon, to move either the transport, the processing station or both relative to one another so that the desired distance from the surface to a reference plane can be adjusted dynamically for the goods item to be processed. FIG. 1 shows a schematic illustration of a plant for processing flat goods as is used in conventional technology. FIG. 1 shows a transport 100 comprising a belt 104 running around two rollers 102a and 102b. Instead of the shown belt, other elements can be used, for example chains having appropriate grippers or the like, as is known in conventional technology in general. The rollers 102a and 102b are pivoted across the bearings 106a, 106b, wherein one of the rollers 102a or 102b is driven by a drive not illustrated in FIG. 1. The transport 100 is arranged in a height-adjustable manner indicated by arrows 108a, 108b. Further the transport 100 comprises rollers 112a, 112b defining, together with the rollers 102a or 102b, a roller pair to determine a transport inlet or a transport outlet.

The plant shown in FIG. 1 further comprises a processing station 200 including, in the example shown, a printer 202 comprising print heads 202a, 202b. The printer can, for example, be an ink jet printer. Similarly to the transport 100, the printer is also arranged in a height-adjustable manner, as is indicated by the arrow 204.

At the inlet 102a, 112a the plant receives the goods passed along the processing station 200 by means of the transport 100 to effect printing of a top surface of the goods. At the input, the plant includes the sensor S to detect the thickness of the goods item, so that, depending on the thickness, either the height position of the transport 100 and/or the height position of the printer 202 can be adjusted such that a desired distance a between the print heads 202a, 202b and the surface of the goods item G on the transport is maintained and hence proper printing can be ensured.

With respect to the above-described approach including top guiding elements for guiding the goods item G, the approach according to FIG. 1 is advantageous, since these top guiding elements can be omitted, so that printing the goods item across its whole area becomes possible. However, the approach of FIG. 1 necessitates significant mechanical effort to either move the transport 100, the printer 202 or both depending on a detected thickness of the goods item. This is also time-consuming since it might necessitate changing the adjustment for each of the goods. Printing can only take place when the adjustment has been completed. Further, the approach shown in FIG. 1 allows only the transportation of a single goods item, since the thickness is detected for each item and respective adjustment is made, so that the throughput, i.e. the number of processed goods per time unit, suffers. Further, there is a problem when the goods have a thickness that varies along the width of the goods item or along the length of the goods item (in the transport direction T), since in this case the sensor might detect only an average thickness of the goods item and thus no optimum distance exists in all areas of the surface of the goods with respect to the print head and thus non-optimum printing takes place.

SUMMARY

According to an embodiment, an apparatus for transporting goods may have: a deformable transport means; a means for supplying a goods item to the deformable transport means; a means for impressing the goods item into the deformable transport means so that a top of the goods item facing away from the transport means comprises a predetermined height position with respect to the means for impressing, wherein the deformable transport means is implemented such that the predetermined height position of the goods item outside the effective area of the means for impressing the goods item is at least temporarily maintained, characterized in that the means for impressing the goods item include an element arranged at a distance to the deformable transport means, and a goods item for impressing into the deformable transport means is moved past the element.

According to another embodiment, a method of transporting goods may have the steps of: supplying a goods item to a deformable transport means; impressing the goods item into the deformable transport means so that a top of the goods item facing away from the deformable transport means comprises a predetermined height position with respect to a means for impressing the item into the deformable transport means; and transporting the impressed goods item, wherein the deformable transport means is implemented such that the predetermined height position of the goods item outside the effective area of the means for impressing the goods item is at least temporarily maintained, characterized in that the means for impressing the goods item include an element arranged at a distance to the deformable transport means, and a goods item for impressing into the deformable transport means is moved past the element.

Thus, according to embodiments, the present invention provides a novel approach for transporting goods, which allows transport of goods having varying thicknesses in a simple manner by avoiding the above-described problems in known approaches such that their top surface comprises a predetermined distance to and a predetermined orientation with respect to a reference plane which is the same for several successively transported goods independent of their thickness and independent of the course of the thickness along the length of the goods or along the width of the goods. Thus, according to the invention, in approaches where a goods item, for example a flat element or a filled envelope, is to be printed by an ink jet printer, on the one hand, the option of obtaining constant quality of the print is to be provided, since the distance between the goods item/envelope and the print head is kept constant at all times, and at the same time the printable area is increased with regard to conventional approaches.

It is a particular advantage that no specific sensor technology is necessitated to detect a thickness of the goods item, since due to the inventive process the desired distance of the surface to the reference plane is essentially defined by impressing the goods item into the deformable transport means. For example, a roller or belt having a predetermined distance to the surface of the non-deformed transport means is provided, so that a goods item supplied between the roller (or the belt) and the transport means is impressed so far into the deformable transport means that all impressed goods have the same distance between their surface and a surface of the non-deformed transport means. Thus, all goods have the same distance to a reference plane in which, for example, the print heads of a print head are arranged. Further, the deformable area allows the transport of several goods having varying thicknesses along the transport device, since the same are, according to the inventive approach, impressed at different depths into the transport means, whereby an increase in the throughput, i.e. an increase of the goods processed per time unit, can be obtained without increasing the processing speed.

In the field of enveloping, the inventive approach is advantageous since the surface of the envelope is oriented in parallel to the reference plane, independent of the filling of the envelope, in particular also with different fillings.

A further advantage of the inventive apparatus is that complex mechanical movement and the respective control of the transport means and the processing means can be omitted.

Thus, according to the invention, an approach is provided where a transport is adapted to the goods item such that its surface has a predetermined distance with respect to a reference plane without necessitating special sensors or an active control, so that the above-mentioned throughput gain is obtained.

BRIEF DESCRIPTION OF THE DRAWINGS

Embodiments of the present invention will be detailed subsequently referring to the appended drawings, in which:

FIG. 2($b$) is a schematic illustration of an assembly similar to the one in FIG. 2($a$), wherein the goods item is impressed into the deformable transport means by a fixed sheet metal so that the same slightly projects over the surface of the non-deformed transport means;

FIG. 2($c$) is a schematic illustration of an assembly similar to the one in FIG. 2($a$), wherein the goods item is impressed into the deformable transport means by means of a roller so that the same is essentially flush with the surface of the non-deformed transport means;

FIG. 8 is a further embodiment of the deformable transport means having a plurality of metal pins, wherein FIG. 8($a$) shows the non-deformed state, and wherein FIG. 8($b$) shows the deformed state;

FIG. 9 is a further embodiment of the deformable transport means having a plurality of spring elements, wherein FIG. 9($a$) shows the non-deformed state, and wherein FIG. 9($b$) shows the deformed state;

FIG. 10 is a further embodiment of the deformable transport means having a transport element filled with a fluid, wherein FIG. 10($a$) shows the non-deformed state, and wherein FIG. 10($b$) shows the deformed state; and FIG. 11 is a further embodiment of the deformable transport means having a transport element filled with a non-liquid material, wherein FIG. 11(a) shows the non-deformed state, and wherein FIG. 11(b) shows the deformed state.

DETAILED DESCRIPTION OF THE INVENTION

In the following description of the embodiments of the invention, the same or equal elements in the different figures are provided with the same reference numbers.

Figure 1:
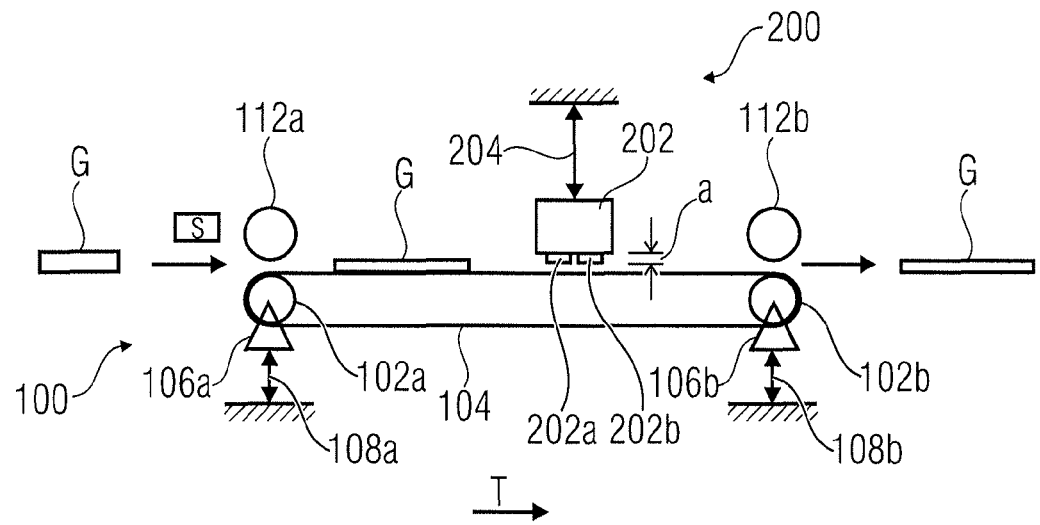
FIG. 1 is a schematic illustration of a known plant for processing flat goods.
Figure 2A:
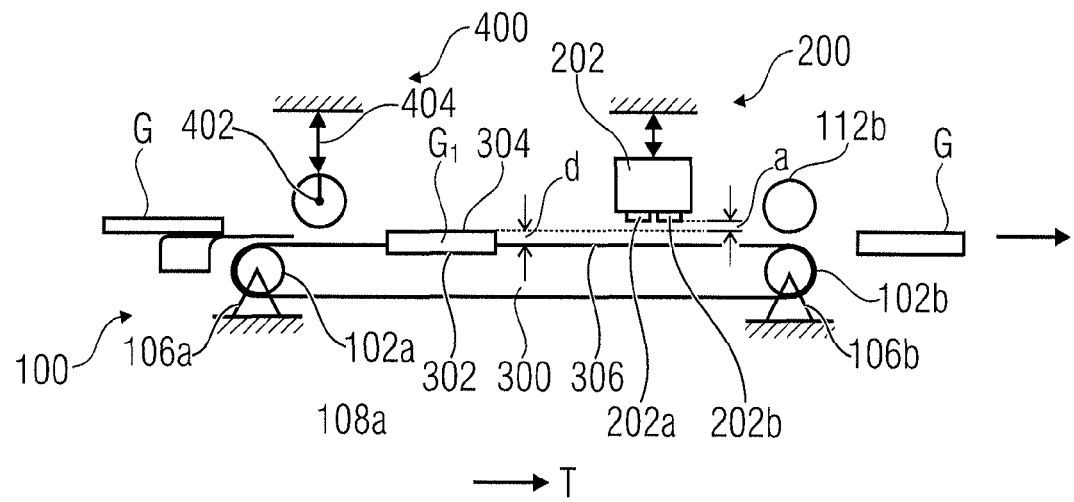
FIG. 2($a$) is a schematic illustration of an assembly similar to the assembly shown in FIG. 1, but comprising the inventive transport, wherein the goods item is impressed into the deformable transport means by a roller so that the same slightly projects over the surface of the non-deformed transport means.

FIG. 2(a) shows a schematic illustration of an assembly similar to the assembly shown in FIG. 1, but provided with the inventive transport. Similarly to the plant shown in FIG. 1, the plant shown in FIG. 2(a) serves to print a surface of a transported goods item G. The plant includes a transport 100 comprising, in the shown example, a transport means 300 running around rollers 102a and 102b. The transport means 300 is deformable, as will be described in more detail below based on different embodiments. The deformability of transport means 300 allows impressing a goods item G moved by the transport 100, as is shown at 302. The goods item G1 is impressed such that its top surface 304 has a desired distance d to the non-deformed area 306 of the transport means 300 or a desired distance d to a means for impressing the goods item into the deformable transport means 300.

In the embodiment shown in FIG. 2(a), the processing station 200 again includes the printer 202 having print heads 202a and 202b, wherein the printer 202, however, is arranged at a fixed height position while processing the goods and is not adjusted during processing. Due to the impression of the goods item G1 in the area 302, due to the inventive approach, apart from the desired distance d, simultaneously the desired distance a of the surface of the goods item G1 to the reference plane results in which the print heads 202a and 202b reside, so that the surface 304 of the goods item G1 can be properly printed. It is not necessitated to implement the transport 100 in a height-adjustable manner, rather, the same can remain at a fixed height position during processing via bearings 106a and 106b. Here, it should be noted that the transport and/or the processing station 200 are basically adjustable with respect to their height, so that prior to processing a specific job including processing a plurality of goods having a thickness within a predetermined range, basic adjustment can be performed to adjust a specific distance between the print head and the transport means.

For impressing the goods G1 into the transport means 302, the plant according to FIG. 2(a) further comprises a supply 400 comprising a roller 402 which can be height-adjustable, as is indicated by the arrow 404. The distance of the roller 402 is selected such that a goods item intended for transport, the goods item on the left-hand side in FIG. 2(a), is impressed into the deformable transport means such that the surface 304 of the goods item facing away from the transport means 306 has the desired height position with respect to the non-deformed transport means 306 or with respect to the roller 402. As can be seen, the goods item for impressing into the transport means 302 is passed along the element for impressing (in FIG. 2 roller 402). Moving the goods item can be performed by the supply. Alternatively or additionally, moving the goods item can be performed by the transport means, in particular when the goods item is only impressed after takeover by the transport means (see, e.g., FIGS. 3 to 5 below). As has been mentioned, the element for impressing can be height-adjustable, for example in order to be adjusted dynamically during operation. Alternatively, the element for impressing can also be arranged in a stationary manner at a specific height; in such an implementation, it can be provided that the element is arranged according to a desired height prior to processing a job.

After impressing the goods item G1, the same is transported by the transport 100 in the desired position with respect to the reference plane, since the deformable transport means is implemented to maintain the deformation effected by impressing the goods item at least during the time until the item has passed the processing station. Thereby, the predetermined height position of the goods item outside the effective area of the means for impressing the goods item is maintained at least temporarily.

As can be seen from a comparison of FIGS. 1 and 2, the inventive approach is advantageous as no sensor technology is necessitated to detect a thickness of the goods item. The goods item is impressed into the transport means 300 via the roller 402 (alternatively a belt) so that the transport means 300 is deformed. The surface 304 is parallel to a reference plane in which, for example, print heads 202a and 202b are arranged. Possible variations of the thickness along the length of the goods item G1 or along the width of the goods item G1 are balanced out by impressing, since the deformable transport means 302 yields according to the thickness of the goods item G1 due to the force applied by the roller 402 during impression.

Thus, not only the sensor technology can be omitted, but also generally the necessity of varying the height position of the transport and/or the processing station 200 during operation, so that simplified processing with increased process reliability is possible.

According to the invention, it is also not necessitated to provide top guiding elements for the goods item G1, since impression 302 into the transport means 300 (deformation of the transport means) outside the effective area of the means for impressing the goods item is also maintained, at least temporarily, and the goods item is moved accordingly in the desired height position, which simultaneously provides the option of processing the whole surface 304 of the goods item G1.

Figure 2B:
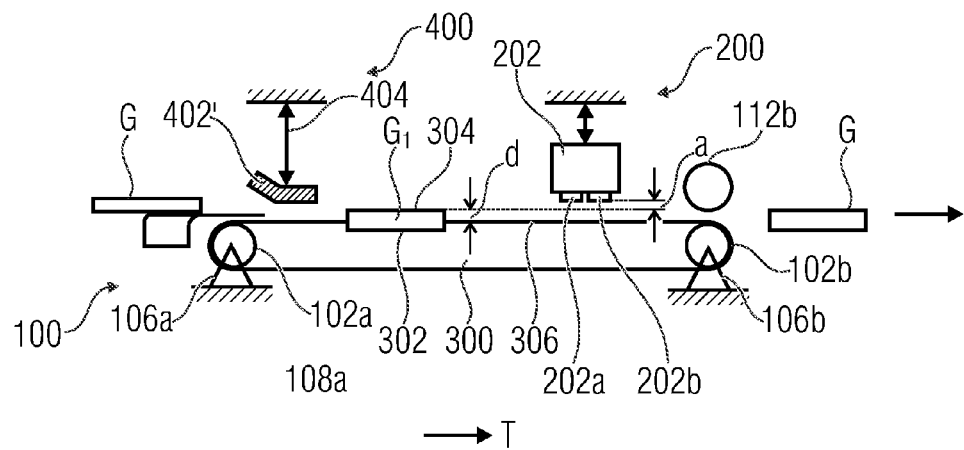

FIG. 2(a) showed an assembly where the goods item is impressed into the deformable transport means by a roller, so that the same slightly projects over the surface of the non-deformed transport means. The present invention is not limited to such an implementation. FIG. 2(b) shows a schematic illustration of an assembly similar to the one in FIG. 2(a), where the goods item is impressed into the deformable transport means by a fixed sheet metal 402' so that the same slightly projects over the surface of the non-deformed transport means. Instead of the bent sheet metal 402', another element such as a crossbar or the like can be provided.

Figure 2C:
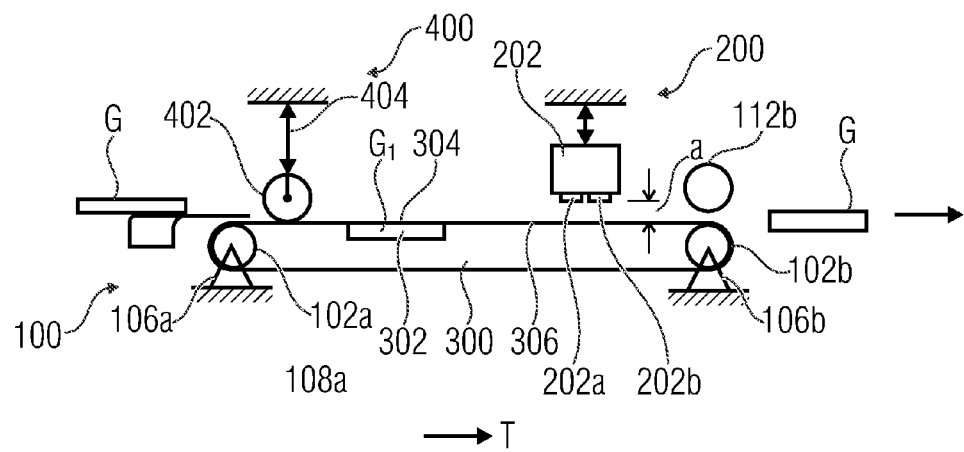

According to the embodiments described so far, the goods item was impressed into the deformable transport means such that the same slightly project over the surface of the non-deformed transport means. The present invention is not limited to such an implementation. FIG. 2(c) is a schematic illustration of an assembly similar to the one in FIG. 2(a), wherein the goods item is impressed into the deformable transport means by the roller 402 such that the same is essentially flush with the surface of the non-deformed transport means. In this case, the predetermined height position d of the surface 302 of the goods item facing away from the transport means 300 is zero or substantially zero with respect to the non-deformed transport means or the means for impressing. In this case, the distance a to the print heads is equal to the distance between the transport means and the print heads.

Figure 3:
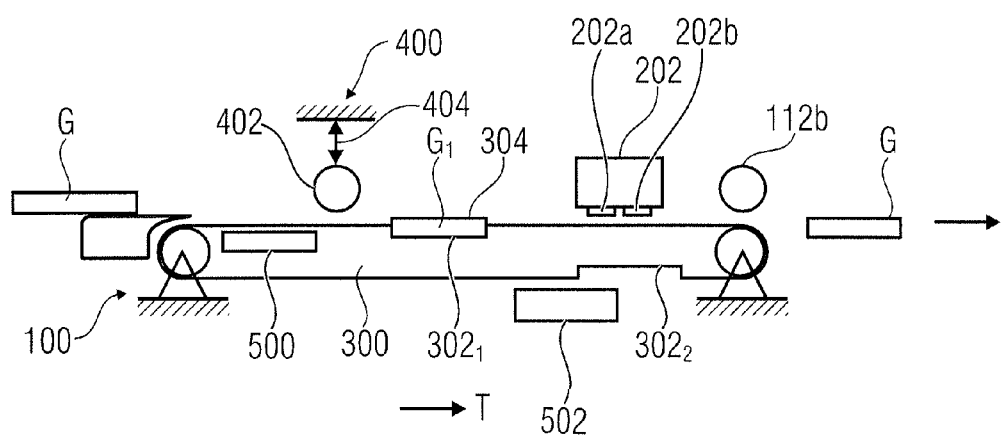
FIG. 3 is a further embodiment of the invention, wherein the transport additionally comprises elements to act on the deformable area to prepare the same for receiving the goods or to effect cancellation of the deformation.

FIG. 3 shows a further embodiment of the invention where the transport 100 additionally includes elements to act on the deformable area to prepare the same for receiving the goods or to effect cancellation of the deformation. In FIG. 3 the elements already described based on FIG. 2 are provided with the same reference numbers and a renewed description is not given. As can be seen in FIG. 3, the transport means 100 comprises, in the area in front of the roller 402, an activation means 500 which is provided in dependence on the implementation of the transport means 300 to activate an area along the transport means such that the same is deformable, for example by providing the material of the transport means 300 with a magnetic field, ultrasound, heat, electric power, radiation or a force. The means 500 can further act mechanically on the transport means 300 to prepare the same for the reception, for example by releasing movable elements or the like. The area prepared in this way is passed along the roller 402 and a goods item is impressed in the above-described way. The deformed area is indicated by reference number $302_1$. After processing, the goods item leaves the plant. Depending on the implementation of the deformable transport means, a deactivation apparatus 502 can be provided which acts on a deformed area $302_2$ which no longer contains the goods item to cancel the deformation as shown in FIG. 3. The means 502 can be provided to act on the transport means mechanically or by a magnetic field, ultrasound, heat, electric power, radiation or a force in order to cancel the deformation. In the case of mechanical action, it can be provided, for example, that the mechanical elements that are in the deformed position are released so that the same can be reset to the original position.

Depending on the implementation of the transport means, the activation or deactivation can include one or several elements acting on the transport means with different means. If the transport means comprises wax, for example, the activation circuit can include a means for sufficiently heating the wax so that a goods item is impressed and a further means for cooling the wax into which the goods item has been impressed so that it keeps its form.

In other embodiments, it can be provided that the activation means extends along the transport up to the processing station or beyond. In such a case, activation can allow the deformability of the transport means and the goods item is impressed and transported. After processing, the active area ends and the transport returns to its original non-deformed shape.

Depending on the implementation of the transport means 300, the activation means and/or the deactivation means can be provided, wherein other embodiments comprise a transport means 300 which maintains a deformation for a predetermined time period which is sufficient to transport and move the goods item held within the deformable area and which subsequently returns to its non-deformed state by itself.

Figure 4:
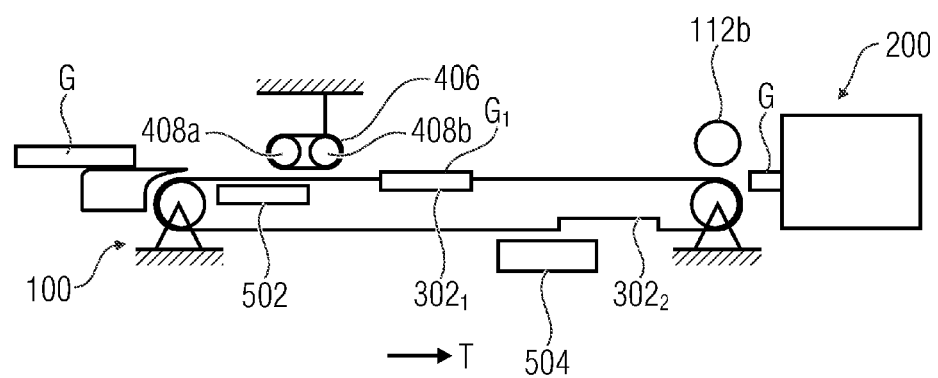
FIG. 4 is the embodiment of FIG. 3, wherein the supply means comprises a belt instead of a roller.

FIG. 4 shows the embodiment of FIG. 3 where the supply means includes, instead of the roller 402, a belt 406 running around two rollers 408a and 408b. Further, in the embodiment shown in FIG. 4, the processing station 200 is not a printer but a station following the transport 100, which takes over the goods item G1 at a desired height position and processes the same further.

Figure 5A:
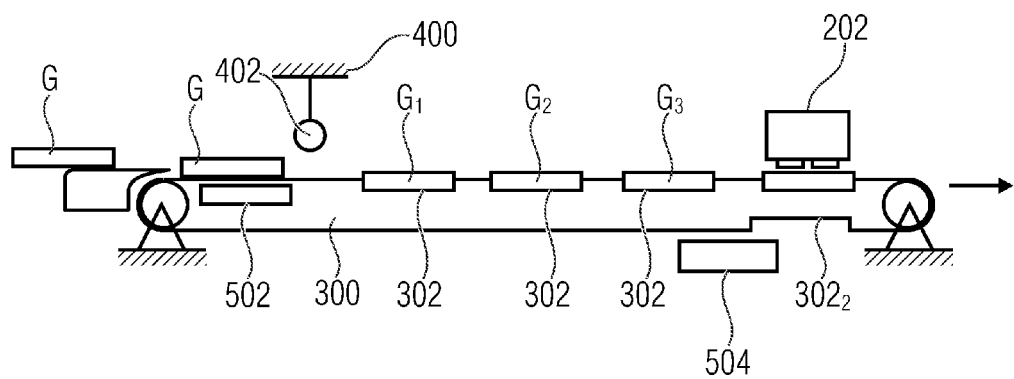
FIG. 5 is an embodiment of the invention, according to which several goods having the same or varying thicknesses are simultaneously moved by or through the transport, wherein FIG. 5($a$) shows a plant similar to the one in FIG. 3, wherein three goods items G1 to G3 are illustrated exemplarily, and wherein FIG. 5($b$) shows an enlarged illustration of the goods items G1 to G3 of FIG. 5($a$)

FIG. 5 shows an embodiment of the invention, according to which several goods having the same or varying thicknesses can be moved simultaneously through the transport means 100, wherein FIG. 5(a) shows a plant similar to the one in FIG. 3, wherein exemplarily 3 goods G1 to G3 are illustrated between the printer 202 and the roller 402.

Figure 5B:
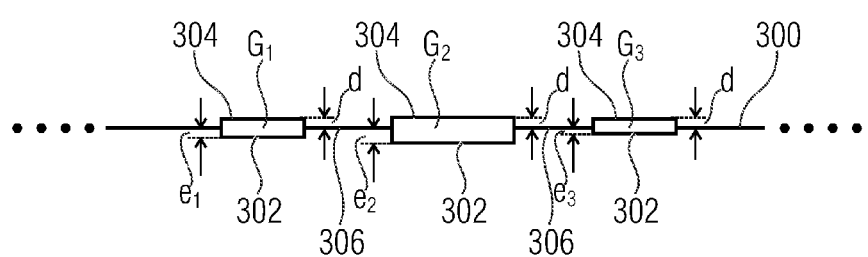

FIG. 5(b) shows an enlarged illustration of the goods G1 to G3 of FIG. 5(a). The different thicknesses of the goods can be seen and accordingly the different introduction depths e1, e2 and e3, wherein e3<e1<e2 applies. Due to the inventive approach, goods $G_1$, $G_3$ are impressed into the transport means 300 such that their top surfaces 304 all have the same distance d to the non-deformed area 306.

Thus, the inventive subject matter according to the embodiment of FIG. 5, in contrary to the known approach described in FIG. 1, allows simultaneous movement of a plurality of goods independent of thickness variations, whereby, as described above, the throughput, i.e. the number of goods processed per time unit, is increased without necessitating an increase in process speed, i.e. the printing speed and the transport speed, so that the process reliability can be improved with a simultaneous increase in throughput.

In the following, examples of implementing the transport means will be discussed in more detail based on the further figures, wherein the transport means 300 is formed either by mechanical elements or by a respectively deformable material. First, based on FIGS. 6 to 9, embodiments will be described comprising mechanical elements for generating the deformable area, and subsequently, based on FIGS. 10 and 11, embodiments of a transport means comprising a deformable material will be described. Based on FIG. 6, an embodiment of the deformable transport means will be discussed in more detail, wherein FIG. 6(a) shows an isometric illustration of the embodiment and FIG. 6(b) details with respect to the implementation of the movable crossbars.

Figure 6A:
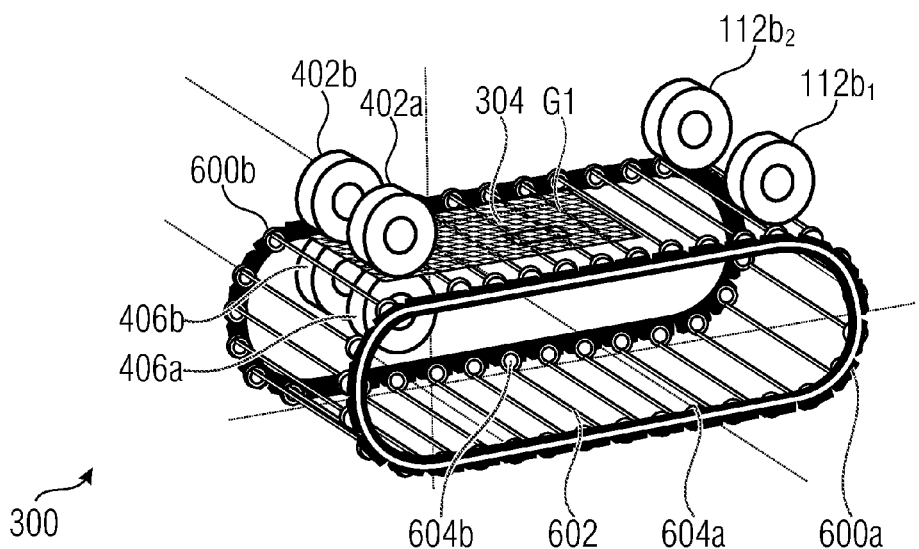
FIG. 6 is an embodiment of the deformable transport means, wherein FIG. 6($a$) is an isometric illustration, and wherein FIG. 6($b$) shows details of the implementation of movable crossbars in the transport means.

FIG. 6(a) shows the transport means 300, schematically shown based on the previous figures, which is deformable as has been explained above, indicated by reference number 300. FIG. 6(a) further shows part of the supply means in the form of the two rollers 402a and 402b, which are arranged in the shown embodiment and define the desired distance between a surface 304 of the goods item G1 to a reference surface or to the surface of the non-deformed transport means. In the shown embodiment, the supply means further comprises counter rollers 406a and 406b that are pivoted in a vertically movable manner to slightly yield when the goods item $G_1$ is inserted. FIG. 6(a) further shows an output roller pair $112b_1$ and $112b_2$.

The transport means 300 shown in FIG. 6(a) comprises two belts 600a, 600b running in parallel, between which a plurality of crossbars 602 extend which are rotatably pivoted across respective sliding clutches 604a and 604b.

Figure 6B:
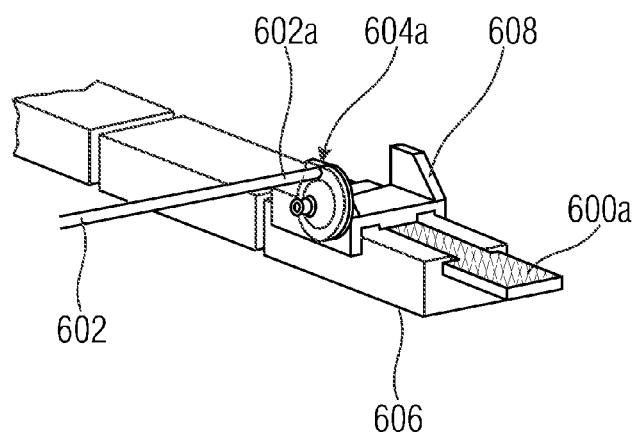

FIG. 6(b) shows details of the assembly of the crossbars. FIG. 6(b) shows the belt 600a circumferentially supported in a guide 606, wherein supports 608 are mounted at predetermined distances along the belt 600a, which are moved together with the belt 600a. A crossbar 602 is arranged above the sliding clutch 604a at the support 608, wherein the end 602a of the crossbar 600 mounted on the sliding clutch 604a is rotatable counterclockwise or clockwise when the crossbar 602 is loaded to change a height position of the crossbar 602 depending on a deposited goods item $G_1$ with respect to the original position shown in FIG. 6(b), so that the height position of the crossbar 602 changes depending on the thickness of the supplied goods item $G_1$. The sliding clutch 604a is implemented such that the crossbar 602 maintains its position without application of force, but when a force is applied, for example by impressing the goods item $G_1$, the same is moved from the shown position into a deflected position along the circumference of the disc shown in FIG. 6(b) and remains in this position for transport of the goods item $G_1$. After termination of the transport, the crossbar 602 can be acted upon by appropriate means to return the same into the original position shown in FIG. 6(b).

The functionality of the embodiment described based on FIG. 6 will be described below based on an envelope $G_1$ whose surface is to be printed. As mentioned above, printing the surface 304 of the envelope $G_1$ necessitates, depending on the thickness of the envelope, an adaptation to maintain a desired height. According to the invention, this is effected by the deformable transport means 300, wherein the height adjustment is realized by the individual crossbars 602 that are adjustable in height. The crossbars 602 are mounted on the transport belt 600a and 600b and adjustment and fixing of the crossbars 602 is performed by sliding clutches 604a and 604b. The crossbars 602 are brought to the starting position in the bottom belt area (see FIG. 6(*a*) (return)). If an envelope runs through the unit, the crossbars 602 stay in their adjusted starting position. This means that they are held in their topmost position (see FIG. 6(*b*)) and this position does not change. In the top belt area, at the inlet 402, the limiting rollers 402a and 402b, or alternatively a belt, are incorporated for limiting the top of the envelope 304. When supplying envelopes, the crossbars are brought to a respective height position depending on the thickness of the supplied envelope, so that the envelope surface 304 has the same height position.

The crossbars are supported at both ends by respective sliding clutches, so that, depending on the envelope filling, orientation with respect to the envelope top takes place, as was explained above, in that, for example in the case of irregular distribution of the thickness across the width of the envelope, a crossbar at one end has a height position that differs from the height position at the opposite end. Also, variations of the thickness along the length of the envelope are balanced out by deflecting the successive crossbars to a different extent.

After the envelopes have been positioned at the desired height, the same are passed below the printer and printed and output for further processing. After printing, according to embodiments, it can be provided that the envelopes are brought to the original transport height to supply same to post-processing. In this case, the sliding clutches can be acted upon so that they are returned to their original position. This can be performed, for example, by using a spring force or by mechanically acting on the crossbars, for example by a stop/bracket or a connecting rod. According to embodiments, returning the crossbars to the original position can be performed after each revolution. Alternatively, it can also be provided that the return means are selectively activated or deactivated, so that, for example, for constant thicknesses of the goods or increasing thickness of the goods no return takes place so that unnecessitated movement of the crossbars is avoided.

The embodiment described based on FIG. 6 is advantageous, since here when balancing out the height only the low mass of the crossbars that are in contact with the envelope has to be moved. The envelopes can be passed along the transport means essentially without a distance between the goods, so that throughput is increased without having to change the transport speed. The height balancing takes place without additional actors or sensors and the envelope surface is continuously orientated in an even manner independent of the filling of the envelopes.

Figure 7:
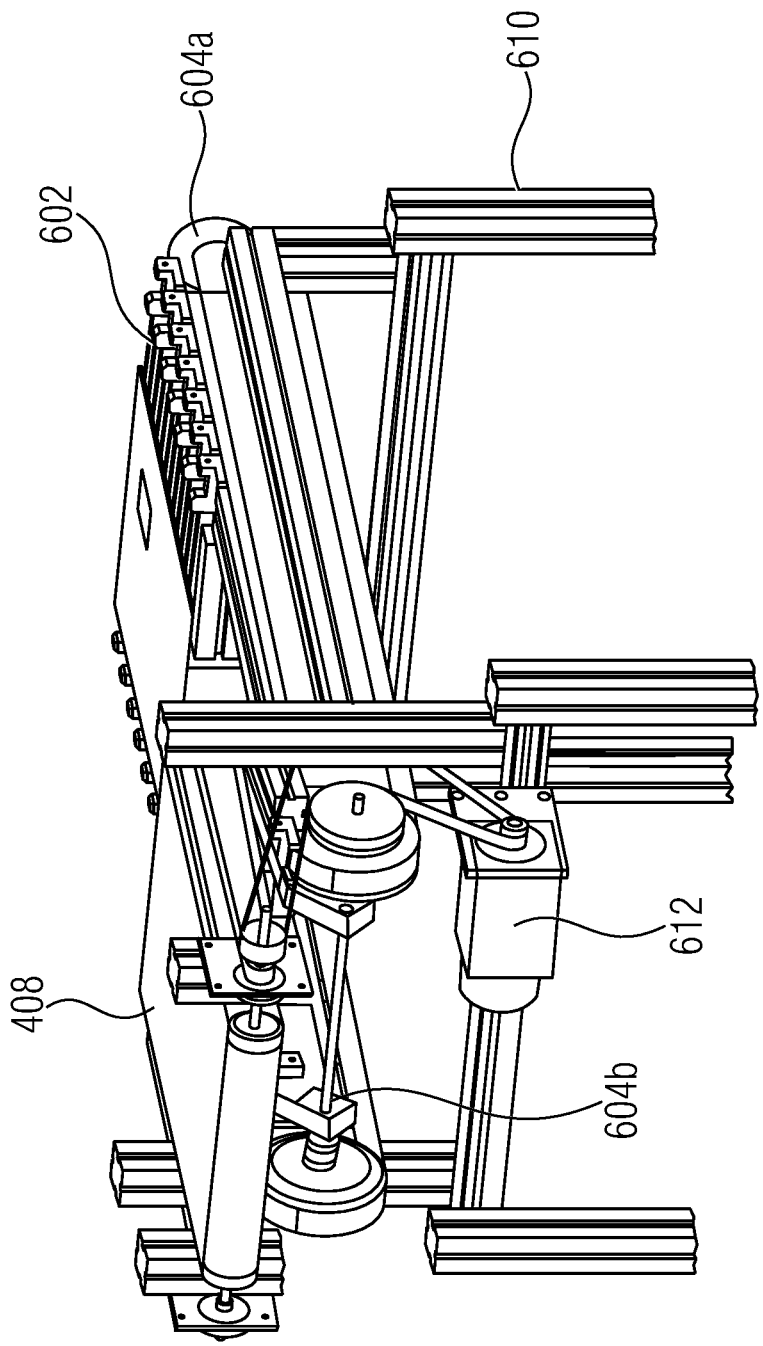
FIG. 7 is the structure of an apparatus according to claim 6, wherein instead of the rollers a belt is provided in the inlet area.

FIG. 7 shows the structure of an apparatus according to FIG. 6, wherein a belt 408 is arranged in the inlet area instead of the rollers 402a and 402b. The assembly rests on a support 610. Further, the drive 612 driving the belts 604a, 604b can be seen.

Instead of the mechanical elements described on the basis of FIGS. 6 and 7, the same can also be implemented differently. FIG. 8 shows a further embodiment for the transport means 300, wherein FIG. 8(*a*) shows the non-deformed state and FIG. 8(*b*) shows the deformed state. FIG. 8 shows an example where the transport means 300 comprises a plurality of pins 800, for example metal pins that are mounted in a vertically movable manner within a support 802. Further, a locking mechanism 804 is provided which effects locking of the same in the deflected position during vertical deflection of the individual pins 800 towards the bottom. The area shown in FIG. 8 is a section of the transport described on the basis of FIGS. 2 to 5 which is implemented in a circumferential manner. FIG. 8(*a*) shows that all pins 800 are not deflected towards the bottom, so that the shown nail bed is formed, where the top ends of the pins 800 are arranged in a common plane. FIG. 8(*b*) shows a situation where a goods item $G_1$ (see dotted line) has been impressed into the transport means, wherein the good item has a varying thickness along the longitudinal direction and/or along the transversal direction. Impressing the goods item $G_1$ effects a deflection of a number of pins 800 towards the bottom so that the same reach the locking mechanism 804 and are held in the deflected position. The deflected pins define the deformed area 302, whereby, by impressing the goods item $G_1$, for example by the input rollers, a desired distance d of all impressed goods $G_1$ is effected with respect to a surface of the non-deformed area 306 of the transport means 300.

In the embodiment according to FIG. 8, it can be provided that the individual metal pins 800 are arranged, during return transport from the outlet to the inlet of the assembly (see FIG. 3), in a position that does not allow any vertical shift. By the means 500, it can be provided that the locking structure 804 is acted on to activate the same so that when the goods item $G_1$ is impressed, a deflection of the individual pins and locking of the same is enabled. In the return, by means of the deactivation means 502, the locking means 804 can be acted upon to release the deflected pins 800 so that the same are, for example due to a return force provided by a spring, returned to their original position (FIG. 8(*a*)) and possible locked to the same.

FIG. 9 shows a further embodiment of the implementation of the deformable transport means by using mechanical means. FIG. 9(*a*) again shows the non-deformed state, and FIG. 9(*b*) shows the state in which a goods item has been impressed into the transport means 300. In the embodiment shown in FIG. 9(*a*), the transport means 300 comprises a plurality of spring elements 300 supported by a support 902. The ends of the spring elements 900 facing away from the support 902 carry a transport surface 904 of a deformable material. Alternatively, the individual spring elements 900 can also comprise, at the ends facing away from the support 902, individual areas so that the adjacent areas of the plurality of spring elements 900 define the surface 904. By impressing a goods item $G_1$ individual elements of the spring elements are deflected towards the bottom, as is shown in FIG. 9(*b*), so that the deformed area 302 results. According to the impression of the goods item $G_1$, its surface remains at the distance d above the non-deformed area 306. In the embodiment illustrated in FIG. 9, the spring element 900 can be mechanically acted upon to effect locking of the same in the deflected state, wherein during return the same are again acted upon to release the locking. Locking the spring elements in the manner shown in FIG. 9(*b*) can be performed by mechanical means, which lock the deflected spring elements at the deflected position, the compressed position in FIG. 9(*b*). Alternatively, the spring elements can also be electrically operated so that the same remain in their deformed position in response to a control signal and release the same only when a respective electric signal is applied or is no longer applied.

Based on FIGS. 10 and 11, examples of the transport means comprising a deformable material will be described in more detail below. FIG. 10 shows a first example of the transport means 300 comprising a transport element 1000 and a fluid-tight casing 1002 to receive a fluid 1004, for example a liquid or a gas, within the casing 1002. Further, a means 1006 is provided corresponding, for example, to the activation means 500 shown in FIG. 3 to allow activation of the fluid 1004, for example to effect a viscosity change of the fluid (e.g. wax), so that the same becomes deformable when a goods item is impressed and also maintains the deformation accordingly. This can be performed, for example, by providing the fluid with a mechanical force, electric power, magnetic radiation, ultrasound or the like. FIG. 10(*b*) shows the transport means 300 after introduction of the goods item $G_1$, wherein again, as was also described above based on FIGS. 8 and 9, the impression is such that the surface of the goods item $G_1$ includes a distance d to the non-deformed surface 306, independent of the thickness distribution of the goods item along the length or width of the item. The means 1006 can further be provided to be effective as a deactivation means 502 (see FIG. 3) to provide, after the transport, the fluid with a mechanical force, electric power, magnetic radiation, ultrasound or the like to return the same to its original non-deformed area.

FIG. 11 shows a further embodiment of a deformable transport means 300 which comprises, similarly to FIG. 10, a transport element 1100 which includes a solid material 1104 within a casing 1102, for example in the form of individual parts, a gel or a granulate. By means of a means 1106, the material 1104 is acted upon in a similar manner as described above based on FIG. 10 to activate the same to allow deformation which will then be maintained until the means 1106 again acts on the material 1104 to cancel the deformation. The parts or particles can be edged, so that, e.g., by applying negative pressure (vacuum), the deformation is maintained due to the resulting locking of the particles. If the negative pressure is terminated, the particles can separate again.

As an alternative to the above-described examples, the transport means 100 can also include a so-called memory material which maintains the deformation either with or without activation after the goods item has been impressed and moves the item accordingly, so that its surface, as explained above, is transported with the desired distance from the non-deformed area. The memory material can return to its original form after transporting the goods item either by itself or by a respective deactivation mechanism as described above.

According to embodiments, the deformable transport means can effect transport of the impressed goods item with the predetermined height position without additional guiding of the top of the item.

According to embodiments, the means for impressing the goods item can be adjustable to impress the goods item with a predetermined height position that can be selected from a plurality of height positions, wherein the means for impressing the goods item include an element arranged at an adjustable distance to the non-deformed transport means, and wherein a goods item is moved between the element and the transport means, wherein the element, during supply, exerts a force on the goods item and the deformable transport means to effect deformation of the deformable transport means according to the thickness of the goods item.

According to embodiments, the deformable transport means can be configured to adapt to the thickness curve of the goods item along and/or transverse to the transport direction, wherein the deformable transport means can be configured to receive a plurality of successively supplied goods. According to embodiments, the successively supplied goods can have the same or varying thicknesses.

According to embodiments, the deformable transport means can include mechanical elements in the form of spring elements to define sections or portions that deform.

While some aspects have been described in the context of an apparatus, it is obvious that these aspects also represent a description of the respective method, so that a block or a device of an apparatus can also be seen as a respective method step or as a feature of a method step. In analogy thereto, aspects described in the context of a method step or as a method step also represent a description of a respective block or detail or feature of a respective apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for transporting goods, comprising:
a deformable transport unit;
a supply unit configured to supply a goods item to the deformable transport unit;
a unit configured to impress the goods item into the deformable transport unit so that a top of the goods item facing away from the transport unit includes a predetermined height position with respect to the unit configured to impress, wherein
the deformable transport unit is configured such that the goods item remains at least temporarily impressed after the goods item leaves the unit configured to impress,
the unit configured to impress includes an element arranged at a distance to the deformable transport, and
a goods item for impressing into the deformable transport unit is moved past the element.

2. The apparatus according to claim 1, wherein the deformable transport unit effects a transport of the impressed goods item with the predetermined height position d.

3. The apparatus according to claim 1, further comprising a processing station configured to process the transported goods item.

4. The apparatus according to claim 3, wherein the predetermined height position is selected according to a defined distance between the top of the goods item and a processing element of the processing station.

5. The apparatus according to claim 3, wherein:
the processing station includes a printer configured to print the goods item, and
the transport unit passes the goods item along a print head of the printer at the predetermined distance.

6. The apparatus according to claim 5, wherein the printer includes an ink jet printer with one or several print heads.

7. The apparatus according to claim 1, wherein the element of the unit configured to impress is adjustable in order to impress the goods item at a predetermined height position selectable from a plurality of height positions.

8. The apparatus according to claim 1, further comprising a unit which acts, subsequently to the transport of the goods item, on the deformed transport unit to restore its non-deformed shape.

9. The apparatus according to claim 1, wherein the deformable transport unit is configured to receive a plurality of successively supplied goods.

10. The apparatus according to claim 1, wherein the deformable transport unit includes mechanical elements to define portions that deform.

11. The apparatus according to claim 10, wherein the transport unit includes two circumferential transport belts, between which a plurality of height-adjustable bars are arranged.

12. The apparatus according to claim 10, wherein the deformable transport unit includes a pin cushion with a plurality of vertically arranged height-adjustable pins.

13. The apparatus according to claim 1, wherein the deformable transport unit includes a deformable material which deforms when a goods item is supplied in order to adapt to the thickness of the goods item.

14. The apparatus according to claim 13, wherein the deformable material becomes deformable by application of a mechanical, electrical or magnetic force and returns to the non-deformed shape by removing the force.

15. The apparatus according to claim 1, wherein the goods include flat goods.

16. The apparatus according to claim 1, further comprising a unit acting, prior to the transport of the goods items, on the deformable transport unit to enable its deformation.

17. A method of transporting goods, comprising:
supplying a goods item to a deformable transport unit;
impressing the goods item into the deformable transport unit so that a top of the goods item facing away from the deformable transport unit includes a predetermined height position with respect to a unit configured to impress the goods item into the deformable transport unit; and
transporting the impressed goods item, wherein
the deformable transport unit is configured such that the goods item remains at least temporarily impressed after the goods item leaves the unit configured to impress,
the unit configured to impress includes an element arranged at a distance to the deformable transport unit, and
a goods item for impressing into the deformable transport unit is moved past the element.

18. The method according to claim 17, wherein, subsequent to transporting the goods item, the deformed transport unit is acted upon to restore its non-deformed shape.

19. The method according to claim 17, wherein, prior to the transport of the goods item, the deformable transport unit is acted upon to enable its deformation by impressing the goods item.

* * * * *